Patented Dec. 22, 1936

2,065,302

UNITED STATES PATENT OFFICE 2,065,302

METHOD FOR OBTAINING SLIGHTLY RELIEVED PHOTOGRAPHIC IMAGES

Carlo Bocca and Luigi Amati, Padova, Italy

No Drawing. Application March 21, 1935, Serial No. 12,260. In Italy April 14, 1934

4 Claims. (Cl. 95—5.6)

One of the most widely employed methods for obtaining photographic relief images consists in printing the images on a layer of sensitized colloid placed over a suitable support (glass, celluloid, Cellophane, etc.).

Under the action of the light, the colloid becomes hard and loses its solubility and its faculty to swell: for obtaining the relief image it is then sufficient to remove (wash out) by means of a solvent that part of the colloid which has not been rendered insoluble.

Such method is not suitable for obtaining slightly relieved images reproducing with absolute sharpness all the details of the printed images.

In fact, if in executing the exposure of the image to be printed same is placed in contact with the sensitive layer to be impressed, in order to obtain a very sharp and slightly relieved image it would be necessary to affect only the surface stratum of the colloid: it is thus evident that by operating in such a manner, there would remain in contact with the support a stratum of colloid which has not been rendered insoluble and which in the following operation of washing out would be completely dissolved causing the image to become detached from the support. On the other hand by affecting the colloid throughout its entire thickness one would avoid the detaching of the image from the support, but one would obtain a strongly relieved image which, as it is known would not be very sharp because of phenomena of light diffusion, whose effect is the more intense the greater is the thickness of the sensitized layer of colloid.

If, on the contrary, the exposure is made by placing the image to be printed in contact with the support of the sensitized colloid, the detaching of the sensitized layer from the support is avoided, but it is impossible to avoid the diffusion of light which, as stated, causes the obtention of images lacking in sharpness. Therefore to reduce the light diffusion to a minimum it would be necessary to employ very thin supports, but here one would encounter drawbacks because of the slight mechanical resistance of such supports.

The present invention has the purpose of eliminating such drawbacks while permitting by a very simple method to obtain images in slight relief and with great sharpness and this without any danger that the sensitized layer will become detached from the support. The invention consists in using layers or coatings prepared by means of a solution of two or several colloids which, at the temperature at which the solution is prepared, are all soluble in the solvent employed for the preparation of said solution, while at the temperature at which the washing out is performed, have a different degree of solubility in the solvent employed for washing out, so that it may be possible to wash out only one or several of the colloids employed, while the other or several others, that is, the less soluble colloids, though remaining substantially unaffected, and hence not rendered insoluble, will not be washed out.

In practice it is in reality advantageous that one or some of the colloids constituting the mixture be practically insoluble in the solvent employed at the temperature at which the washing out is performed.

To better explain how a relief image is obtained according to the present invention we give herebelow an example of how this invention can be carried out when using a mixture of two colloids.

Example

One mixes equal volumes of two hot aqueous solutions one of which contains from 4 to 8% of gelatine and the other from 1 to 5% of albumen and one spreads the mixture over a support such as glass, celluloid, Cellophane etc. After drying, one sensitizes the spread mixture, for example, by means of bichromates.

The sensitive layer thus obtained, after exposure has been executed by placing the image to be printed in contact with the sensitized layer, is washed out with cold water. The water carries away only the unaffected albumen: the swelling which the unaffacted gelatine undergoes facilitates the removal of the albumen.

The washing out being performed, one allows the layer to dry, a very sharp slightly relieved image being so obtained.

During the execution of the various operations above described the gelatine layer remains always perfectly adherent to the support.

Other mixtures of colloids which can be employed for executing the present invention are the following:—gelatine and gum arabic;—gelatine and glue that is soluble in cold water; (in washing out, cold water is employed which does not wash out the gelatine);—gelatine and casein; (in washing out, cold and slightly alkalized water is employed which washes out only the unaffected casein);—Agar-Agar and gelatine;—silk gum and gelatine; (in washing out, tepid water is employed which washes out only the unaffected gelatine);—gelatine, gum arabic and albumen; (in washing out, cold water is employed which washes out only the unaffected gum arabic and albumen).

The present invention is not to be limited to the above mentioned mixtures which are here indicated only by way of example.

The method which forms the subject of the present invention is very suitable for obtaining grated images according to the printing method described in the United States Patent application filed on July 21st, 1933, Ser. No. 681,472.

In fact, in the grated images obtained by operating according to the present invention, the ruling, which constitutes the image of the complex grating, can be obtained very sharp and with the relief necessary for light diffraction to take place with the desired intensity. Moreover the images so obtained afford the advantage, in respect of the images not in relief obtained by common photographic processes, of possessing a much greater transparency, which is particularly important when such images are to be used for photographic or cinematographic projections.

Having now particularly described and ascertained the nature of our said invention and in what manner the same is to be performed, we declare that what we claim is:

1. In a method for obtaining slightly relieved photographic images, which consists in preparing an aqueous solution of at least two gelatinous organic colloids which at temperatures lower than the temperature at which said solution is prepared have a different degree of solubility in water, spreading a layer of said solution upon a support and drying the same, sensitizing the layer upon said support by means of a bichromate compound, subsequently exposing the sensitized layer photographically to light, thereafter washing out the exposed layer with water in order to eliminate the unaffected colloids and then drying the washed layer, the feature, which consists in carrying out the step of washing out of the exposed layer at temperatures at which part of the colloids constituting said layer are substantially insoluble by virtue of having a different degree of solubility in water than the other colloid content of the layer in order to avoid eliminating the less soluble unaffected colloids in said layer.

2. In a method for obtaining slightly relieved photographic images, which consists in preparing an aqueous solution containing bichromate compounds and at least two gelatinous organic colloids which at temperatures lower than the temperature at which said solution is prepared have a different degree of solubility in water, spreading a layer of said solution upon a support and drying the same, subsequently exposing the layer photographically to light, thereafter washing out the exposed layer with water in order to eliminate the unaffected colloids and then drying the washed layer, the feature, which consists in carrying out the step of washing out of the exposed layer at temperatures at which part of the colloids constituting said layer are substantially insoluble by virtue of having a different degree of solubility in water than the other colloid content of the layer in order to avoid eliminating the less soluble unaffected colloids in said layer.

3. In the method according to claim 1, the feature which consists in carrying out the step of washing out with alkalinized water.

4. In the method according to claim 2, the feature which consists in carrying out the step of washing out with alkanized water.

CARLO BOCCA.
LUIGI AMATI.